United States Patent [19]
Yamamoto

[11] Patent Number: 6,041,192
[45] Date of Patent: Mar. 21, 2000

[54] INFORMATION RECORDING DEVICE

[75] Inventor: Yasuhiro Yamamoto, Tokyo, Japan

[73] Assignee: Asahi Kogaku Kogyo Kabushiki Kaisha, Tokyo, Japan

[21] Appl. No.: 08/829,186

[22] Filed: Mar. 31, 1997

[30] Foreign Application Priority Data

Apr. 2, 1996 [JP] Japan ................................ 8-104534

[51] Int. Cl.$^7$ ........................... G03B 17/24; G03B 17/48; G03B 29/00
[52] U.S. Cl. ............................. 396/315; 396/429
[58] Field of Search ............................. 396/30, 429, 430, 396/315, 318, 310

[56] References Cited

U.S. PATENT DOCUMENTS

| | | | |
|---|---|---|---|
| 4,945,423 | 7/1990 | Takanashi et al. ...................... | 358/300 |
| 5,119,119 | 6/1992 | Amano et al. .......................... | 354/106 |
| 5,148,197 | 9/1992 | Kunishige ............................... | 354/106 |
| 5,424,156 | 6/1995 | Aoki et al. . | |
| 5,493,354 | 2/1996 | Watanabe et al. ...................... | 354/106 |
| 5,646,927 | 7/1997 | Shimizu et al. ........................ | 369/99 |
| 5,678,084 | 10/1997 | Hori ...................................... | 396/317 |
| 5,860,035 | 1/1999 | Sato ...................................... | 396/429 |

FOREIGN PATENT DOCUMENTS 5-2280  1/1993  Japan .

*Primary Examiner*—Safet Metjahic
*Assistant Examiner*—Christopher Mahoney
*Attorney, Agent, or Firm*—Greenblum & Bernstein, P.L.C.

[57] ABSTRACT

A device is provided for recording information on an electro-developing recording medium by which an image is electronically developed. The electro-developing recording medium has first, second, and third recording areas in which green, red, and blue images are recorded, respectively. An information recording area is provided close to each of the first, second, and third recording areas. An information code, which is in a form of a bar code, is optically recorded in the information recording area while the electro-developing recording medium is moved.

13 Claims, 13 Drawing Sheets

R/G SIGNAL

B/G SIGNAL

|  | FIRST IMAGE REC. AREA | SECOND IMAGE REC. AREA | THIRD IMAGE REC. AREA |
|---|---|---|---|
| WB | R NORMALIZATION COEFFICIENT | B NORMALIZATION COEFFICIENT | OTHER INFORMATION |
| DATE | YEAR | MONTH | DAY |

| A | B | R |
|---|---|---|
| 0 | 0 | R1 |
| 0 | 1 | R2 |
| 1 | 0 | R3 |
| 1 | 1 | R4 |

INFORMATION RECORDING DEVICE

BACKGROUND OF THE INVENTION

1. Field of the Invention

The present invention relates to a recording medium on which an image is electronically developed, and more particularly, to a device for recording information other than an image on the recording medium.

2. Description of the Related Art

Conventionally, as disclosed in Japanese Unexamined Patent Publication No. 5-2280 and U. S. Pat. No. 5,424,156, there is known a photographic material which is directly and electronically developed so that the developed visible image can be immediately obtained. In this specification, such a recording medium is referred to as an electro-developing recording medium, and an electronic still camera using the electro-developing recording medium is referred to as an electro-developing type camera.

The conventional electro-developing type camera, however, is not constructed so that various information related to a photographed picture such as the photographed date can be recorded on the electro-developing recording medium. Therefore, when the image developed by the electro-developing recording medium is reproduced, for example, information such as the photographed date can not be indicated on the display device.

SUMMARY OF THE INVENTION

Therefore, an object of the present invention is to provide a device which can record information other than an object image on an electro-developing recording medium.

According to the present invention, there is provided a device for recording information, comprising an electro-developing recording medium by which an image formed thereon is electronically developed, an information recording processor, and a moving mechanism.

The electro-developing recording medium has an image recording area, in which an object image is recorded, and an information recording area, in which information other than the object image is recorded. The information recording processor records the information in the information recording area. The information is recorded by repeatedly turning ON and OFF a light beam emitted by a light source onto the information recording area. The moving mechanism moves one of the electro-developing recording medium and the light source in a predetermined direction. The information recording processor records the information while either the electro-developing recording medium or the light source is moved by the moving mechanism.

Further, according to the present invention, there is provided a device for recording information, comprising an electro-developing recording medium by which an image formed thereon is electronically developed, a light source, a moving mechanism, and an information recording processor.

The electro-developing recording medium has an image recording area, in which an object image is recorded, and an information recording area, in which information other than the object image is recorded. The light source emits a light beam onto the information recording area. The moving mechanism moves either the electro-developing recording medium or the light source. The control processor controls the light source while one of the electro-developing recording medium and the light source is moved by the moving mechanism, so that the intensity of the light beam is changed to form the information in the information recording area.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
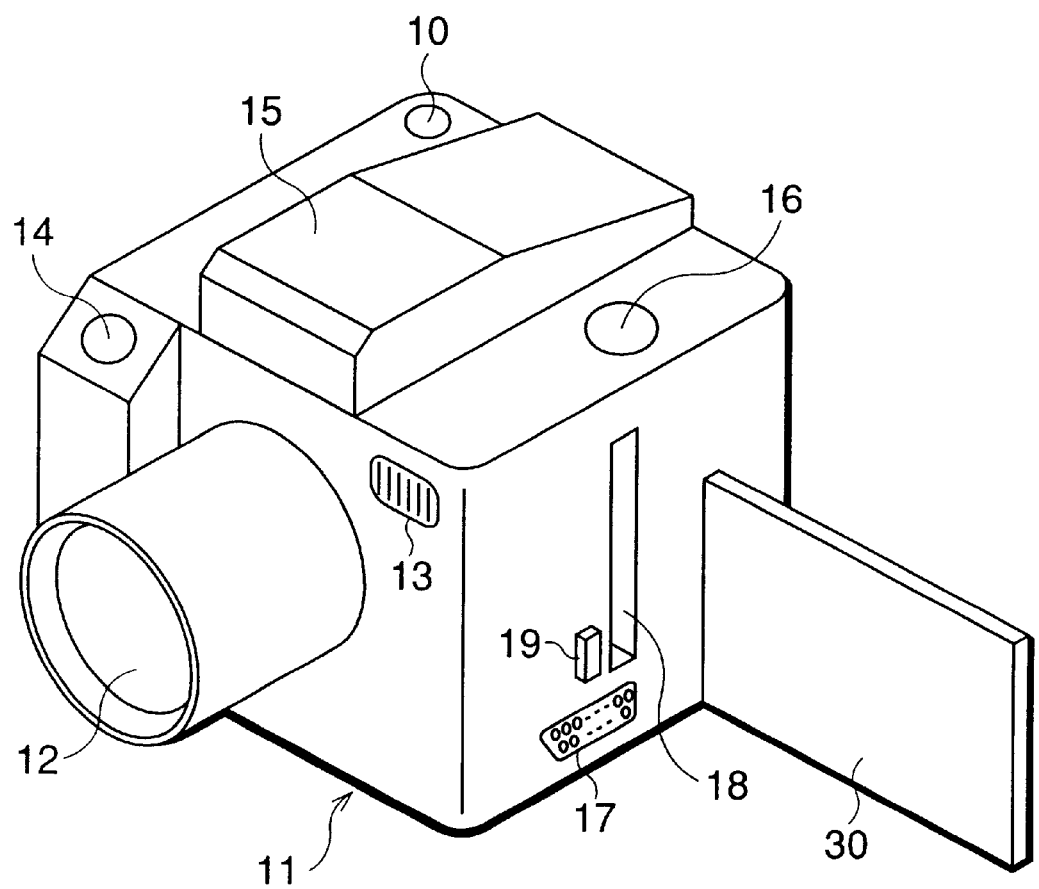
FIG. 1 is an external view showing an electro-developing type camera to which a first embodiment of the present invention is applied.

FIG. 1 is an external view of an electro-developing type camera to which a first embodiment according to the present invention is applied.

When viewing a camera body 11 from the front side, a photographing optical system 12 including a photographing lens system and so on is provided approximately at the center portion of the front surface of the camera body 11, and an electronic flash 13 is disposed thereon to the right of and above the photographing optical system 12. A release button 14 is provided on the side opposite to the electronic flash 13.

On the upper surface of the camera body 11, a view-finder 15 is provided at the center portion thereof and is extended from the front to the rear end of the camera body 11. A main switch 10, by which an electric power can be turned ON, is provided on the upper surface and beside the view-finder 15. A scan start switch 16 is provided on the side opposite to the main switch 10. The scan start switch 16 is provided for starting a reading operation in which an image recorded on an electro-developing recording medium 30 is read.

An output terminal 17 is provided on a lower portion of a side surface of the camera body 11, so that an image signal obtained by this camera can be outputted to an external recording device (not shown). Further, a slot 18, into which the electro-developing recording medium 30 is mounted in the camera body 11, is formed on the side surface of the camera body 11, and an eject switch 19, which is pressed to remove the electro-developing recording medium 30 from the camera body 11, is provided close to the slot 18.

Figure 2:
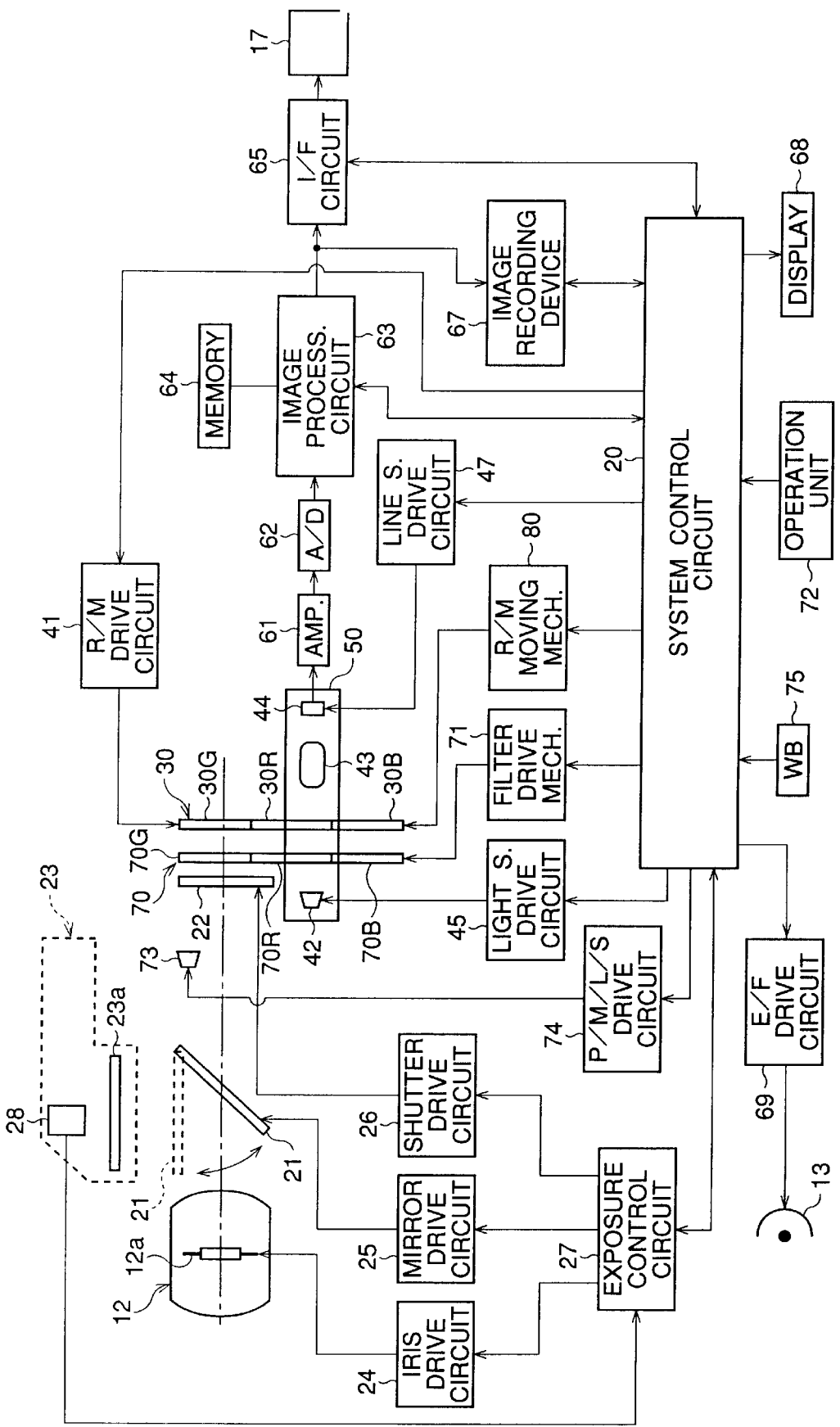
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12. A color filter (i.e., dichroic filter) 70 is provided in front of the electro-developing recording medium 30. A quick return mirror 21 is placed between the photographing optical system 12 and the color filter 70. A shutter 22 is provided between the quick return mirror 21 and the color filter 70. A focusing glass 23a included in a view-finder optical system 23 is disposed above the quick return mirror 21. A photometry sensor 28 is disposed in the view-finder optical system 23 to sense the amount of light beam led from the photographing optical system 12.

The electro-developing recording medium 30 has a first, a second, and a third recording area 30G, 30R, and 30B, respectively, and each area corresponds to the size of one frame's worth of an object image. The color filter 70 has a G (green) filter element 70G, an R (red) filter element 70R, and a B (blue) filter element 70B, each having the same size as the image recording areas 30G, 30R, and 30B, respectively, i.e., corresponding to one frame's worth of an object image. Namely, an image formed by the photographing optical system 12 is color-separated by the color filter 70 into a red image, a green image, and a blue image, each of which is recorded in each of the corresponding image recording areas 30G, 30R, and 30B.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure operation is performed, the degree of opening of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, thus forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A support member 50, which is fixed to a fixed frame (not shown), is provided close to the shutter 22. A main light source 42, a scanner optical system 43, and a line sensor 44 are supported by the support member 50. The main light source 42 has a plurality of LEDs (photodiodes). The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The scanner optical system 43 is disposed between the main light source 42 and the line sensor 44. The light source 42, the scanner optical system 43, and the line sensor 44 are arranged in parallel to the optical axis of the photographing optical system 12.

The color filter 70 and the electro-developing recording medium 30 can be moved in a direction perpendicular to the optical axis of the photographing optical system 12. The color filter 70 and the electro-developing recording medium 30 are moved by a filter drive mechanism 71 and a recording medium moving mechanism 80, respectively.

In a photographing operation, the color filter 70 and the electro-developing recording medium 30 are moved as one, so that either the centers of the G filter element 70G and the first recording area 30G, or the centers of the R filter element 70R and the second recording area 30R, or the centers of the B filter element 70B and the third recording area 30B are positioned on the optical axis of the photographing optical system 12. Namely, G, R, and B images are recorded in the first, second, and third recording areas 30G, 30R, and 30B, respectively.

When an image recorded on the electro-developing recording medium 30 is read, the color filter 70 is fixed at a position to retreat from the support member 50, i.e., the side of the shutter 22, for example. In this state, each of the recording areas 30R, 30G, and 30B is moved between the light source 42 and the scanner optical system 43 in a direction perpendicular to the optical axis of the scanner optical system 43. Namely, the image recorded on the electro-developing recording medium 30 is illuminated by the light source 42 and formed on the light receiving surface of the line sensor 44, through an operation of the scanner optical system 43.

ON and OFF control of the light source 42 is performed by a light source drive circuit 45. Control of the reading operation of pixel signals generated in the line sensor 44 is carried out by a line sensor drive circuit 47. The circuits 45 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth of pixel signals.

The pixel signals read from the memory 64 are inputted to an interface circuit 65 through the image processing circuit 63, so that the pixel signals are subjected to a predetermined process such as a format conversion, and can then be outputted to an external computer (not shown) through the output terminal 17. The pixel signals outputted from the image process circuit 63 are subjected to a predetermined process such as an image compression and a format conversion in a recording device control circuit (not shown), so that the pixel signals can be recorded on a recording medium such as an IC memory card, for example, in an image recording device 67. The interface circuit 65 and the image recording device 67 are operated in accordance with a command signal outputted from the system control circuit 20.

An operation unit 72 including the main switch 10, the release button 14, the scan start switch 16, and so on is connected to the system control circuit 20. A photography operation (i.e., a recording operation), in which an image is recorded on the electro-developing recording medium 30, and a reading operation, in which the image is read from the electro-developing recording medium 30, are performed by operating the operation unit 72. Further, the operation unit 72 is provided with an operation button which is used for setting the date and time on an installed watch (not shown), which is used for recording photographed date and time.

A display device 68 is connected to the system control circuit 20 to indicate various setting conditions of the electro-developing type camera. The photographed date and time are indicated by the display device 68. Further, an electric flash drive circuit 69 is connected to the system control circuit 20 to control the flash operation of the electronic flash 13, and a white balance sensor 75 is connected to the system control circuit 20 to detect a color temperature of the ambient light around the object to be photographed.

Each of the G, R, and B images read from the electro-developing recording medium 30 is superimposed on one another, so that an object image having a natural color is reproduced on a computer display monitor. In this operation, the relative position of each of the G, R, and B images should be adjusted with one another. Therefore, in the photographing operation, a positioning mark indicating the relative position of each of the G, R, and B images is recorded in a portion beside each of the recording areas 30G, 30R, and 30B. Further, data indicating information other than the object image is optically recorded on a portion close to each of the image recording areas 30G, 30R, and 30B.

For recording the positioning marks and the data, a positioning mark light source 73 is provided at a portion close to a surface of the shutter 22, which surface faces the photographing optical system 12. ON and OFF control of the light source 73 is performed by a positioning mark light source drive circuit 74, which is operated based on a command signal outputted by the system control circuit 20.

Figure 3:
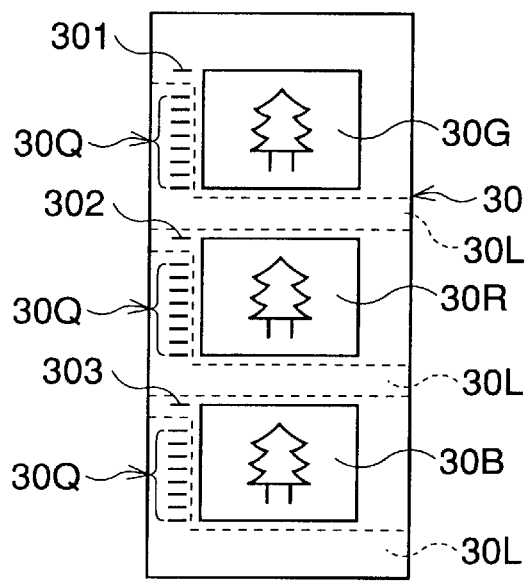
FIG. 3 is a front view showing an electro-developing recording medium.

FIG. 3 shows the electro-developing recording medium 30. The electro-developing recording medium 30 is a rectangular plate, and is provided with the first, second, and third recording areas 30G, 30R, and 30B which are arranged vertically on the electro-developing recording medium 30. In a recorded electro-developing recording medium 30, positioning marks 301, 302, and 303 are formed at a portion close to the left corners of the first, second, and third recording areas 30G, 30R, and 30B, respectively.

The positioning mark 301 is linear, and extends horizontally from the upper end portion of the first recording area 30G. The positioning marks 302 and 303 are also linear, and are positioned beside the second and third recording areas 30R and 30B, respectively, similarly to the positioning mark 301.

Each of the L-shaped information recording areas 30L is provided at a portion close to the left and lower side of each of the first recording areas 30G, 30R, and 30B. In the information recording areas 30L, an information code 30Q, which is in a bar code form and corresponds to information such as a photographed date and time, a color temperature information, and so on, i.e. other than the object image, is recorded. The color temperature information is used for performing a white balance adjustment, when G, R, and B images recorded in the first, second, and third recording areas 30G, 30R, and 30B are superimposed to form a single color image. The information code 30Q is composed of a plurality of linear symbols which are parallel to the positioning marks 301, 302, and 303. These symbols are arranged in a direction in which the recording areas 30G, 30R, and 30B are arranged.

As shown in FIG. 3, the image recording areas 30G, 30R, and 30B and the three information recording areas 30L are electrically separated from each other. Namely, an electric voltage is independently applied to each of the image recording areas 30G, 30R, and 30B. When images are recorded in the image recording areas 30G, 30R, and 30B, the positioning marks 301, 302, and 303 corresponding to these images are recorded beside the recording areas 30G, 30R, and 30B, and after all of the image recording areas 30G, 30R, and 30B have been recorded, the information codes 30Q are recorded.

Figure 4:
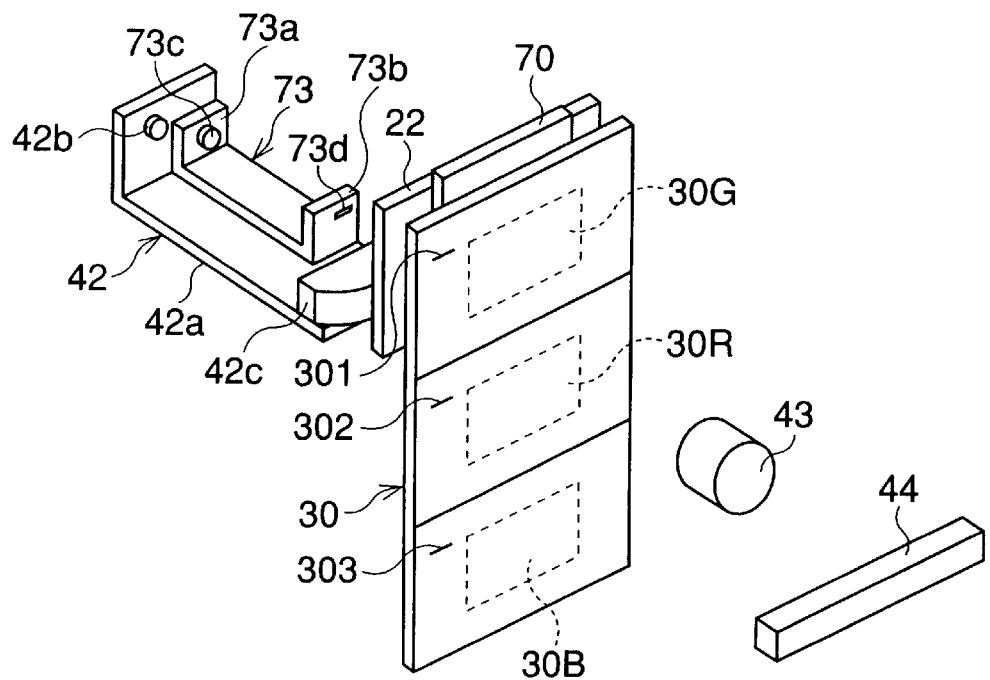
FIG. 4 is a perspective view showing constructions of a main light source and a positioning mark light source.

FIG. 4 shows constructions of the main light source 42 and the positioning mark light source 73. The main light source 42 has a support frame 42a, an LED 42b, and a lens 42c. The LED 42b and the lens 42c are attached to the support frame 42a, and a light emitted by the LED 42b enters the lens 42c. The illumination light passing through the lens 42c appears as a linear strip extending in a horizontal direction for each of the recording areas 30G, 30R, and 30B. This illumination light is a parallel light beam, which passes through the electro-developing recording medium 30, and is condensed on the light receiving surface of the line sensor 44 by the scanner optical system 43.

The positioning mark light source 73 is located above the main light source 42. The positioning mark light source 73 has a support frame with a pair of flanges 73a and 73b. An LED 73c is attached to the first flange 73a, and a linear slit 73d is formed in the second flange 73b. A light outputted by the LED 73c passes through the slit 73d, and is radiated onto a portion close to either one of the recording areas 30G, 30R, or 30B, through outside of the shutter 22. Note that, in a state shown in FIG. 4, the main light source 42 is positioned so that the lens 42c faces the upper end of the second recording area 30R, and the positioning mark light source 73 is set so that the slit 73d face a portion close to a corner of the first recording area 30G.

In the initial state of the photographing operation, as shown in FIGS. 2 and 4, the G filter element 70G and the first recording area 30G are positioned on the optical axis of the photographing optical system 12, i.e., behind the shutter 22. In this state, by opening and closing the shutter 22, a G image is recorded on the first G recording area 30G. Further, in this recording operation, the positioning mark 301 is recorded on the upper side end of the first recording area 30G by the operation of the positioning mark light source 73.

When this recording operation ends, the color filter 70 and the electro-developing recording medium 30 are moved upward as one, so that the R filter element 70R and the second recording area 30R are set to positions behind the shutter 22. Thus, an R image is recorded in the second recording area 30R, and the positioning mark 302 is recorded on a side portion of the upper end of the second recording area 30R.

Then, the color filter 70 and the electro-developing recording medium 30 are moved up again, so that the B filter element 70B and the third recording area 30B are set to portions behind the shutter 22. Thus, a B image is recorded in the third recording area 30B, and the positioning mark 303 is recorded in a side portion of the upper end of the third recording area 30B.

Figure 5A:
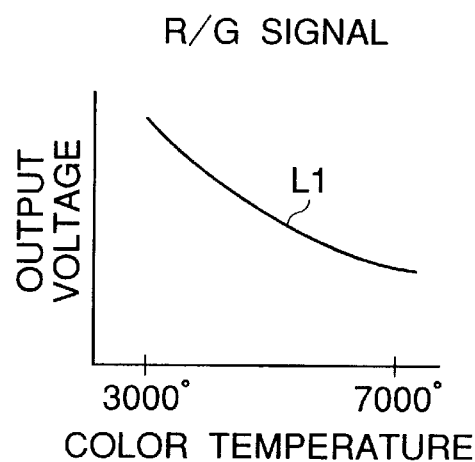
FIGS. 5A and 5B are graphs showing output characteristics of a white balance sensor.
Figure 5B:
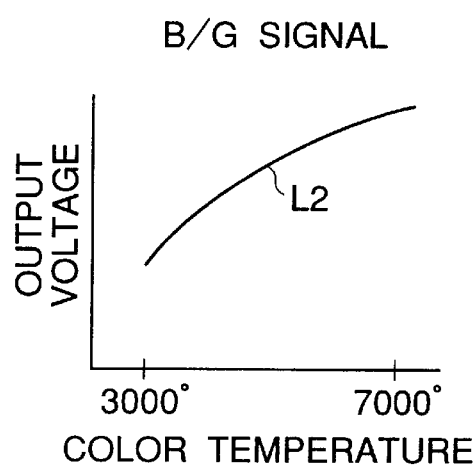
Figure 6A:
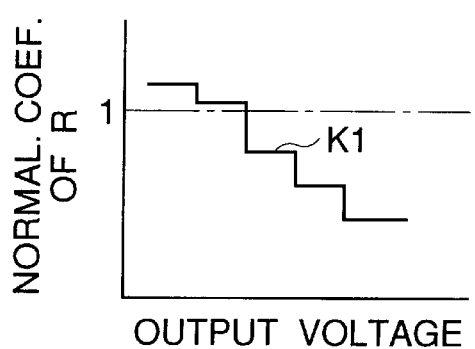
FIG. 6A is a graph showing the relationship between the output characteristics and the normalization coefficient corresponding to the color temperature information regarding a second recording area.
Figure 6B:
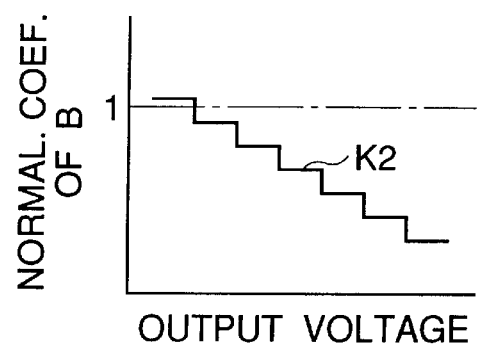
FIG. 6B is a graph showing the relationship between the output characteristics and the normalization coefficient corresponding to the color temperature information regarding a third recording area.

FIGS. 5A and 5B show output characteristics of the white balance sensor 75. FIG. 6A shows the relationship between the output characteristics and the normalization coefficient corresponding to the color temperature information regarding the second recording area 30R, and FIG. 6B shows relationship between the output characteristics and the normalization coefficient corresponding to the color temperature information regarding the third recording area 30B. Note that the normalization coefficients are stored in a memory of the system control circuit 20 in a form of a table, for example.

The white balance sensor 75 outputs an R/G signal and a B/G signal which are electric voltage signals. The R/G signal indicates the ratio of an R component and a G component contained in the incident light into the white balance sensor 75, and the B/G signal indicates a ratio of a B component and the G component contained in the incident light.

The value of the R/G signal is decreased as the color temperature is raised, as shown by the line L1 in FIG. 5A. The value of the B/G signal is increased as the color temperature is raised, as shown by the line L2 in FIG. 5B. As the R/G signal is decreased, the first normalization coefficient corresponding to R is set to have a smaller value as shown by the reference K1 since the ratio of the R component included in the ambient light of the object is decreased. Similarly, as the B/G signal is increased, the second normalization coefficient corresponding to B is set to have a smaller value as shown by the reference K2 since the ratio of the B component included in the ambient light of the object is decreased.

Figures 7, 8:
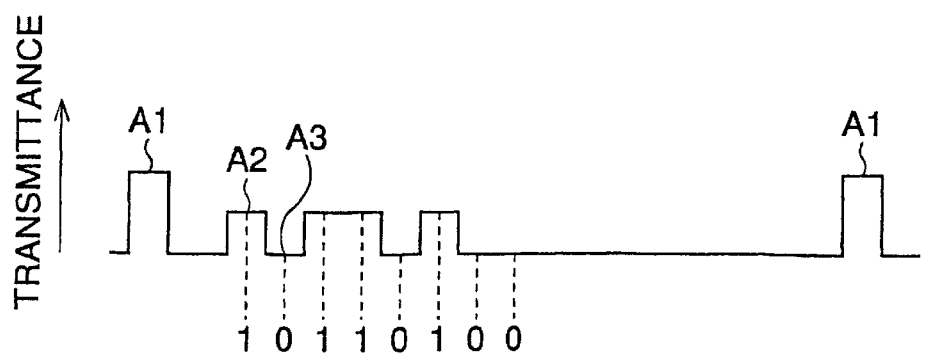
FIG. 7 is a table showing the contents recorded in an information code.
FIG. 8 is a view showing an example of transmittances of linear images which are recorded in the electro-developing recording medium, as a positioning mark and a information code.

FIG. 7 shows data recorded in the information code 30Q formed a portion close to each of the image recording areas 30G, 30B, and 30R. In the information code 30Q, the photographed date, the color temperature information (WB), and so on are recorded, and after all of the image recording areas 30G, 30R, and 30B have been recorded, the information code is recorded while the electro-developing recording medium 30 is moved.

In the information recording area 30L close to the first recording area 30G, the first normalization coefficient of R, which is obtained by setting the gain of G in the white balance adjustment to 1, i.e., the R/G color temperature information, and the photographed "Year" are recorded. In the information recording area 30L close to the second recording area 30R, the second normalization coefficient of B, which is obtained by setting the gain of G in the white balance adjustment to 1, i.e., the B/G color temperature information, and the photographed "Month" are recorded. In the information recording area 30L close to the third recording area 30B, the photographed "Day" is recorded, and any information other than the color temperature information can be recorded as well.

The information code 30Q is formed by changing the intensity of a light beam outputted by the LED 73c of the positioning mark light source 73 while one of the electro-developing recording medium 30 or the positioning mark light source 73 is moved. In this embodiment, the electro-developing recording medium 30 or the positioning mark light source 73 is moved by the moving mechanism 80, so that the information code 30Q is formed.

FIG. 8 shows an example of transmittances of linear images which are recorded in the electro-developing recording medium 30, as the positioning marks 301, 302, and 303, and the information code 30Q. In this example, the positioning marks 301, 302, and 303 have relatively high transmittances as shown by references A1. The information code 30Q is digital data and indicated by "1" or "0". As shown by reference A2, data "1" has a transmittance lower than the positioning marks 301, 302, and 303, and as shown by reference A3, data "0" has a transmittance lower than the data "1".

In the information recording area 30L close to the first recording area 30G, the first normalization coefficient K1 (see FIG. 6A), which is the R/G color temperature information, is recorded as 8 bit data, and the "Year" information of the photographed date is recorded as a 7 bit data. In the information recording area 30L close to the second recording area 30R, the second normalization coefficient K2 (see FIG. 6B), which is the B/G color temperature information, is recorded as an 8 bit data, and the "Month" information of the photographed date is recorded as a 4 bit data. In the information recording area 30L close to the third recording area 30B, normalization other than the color temperature information is recorded as an 8 bit data, and the "Day" information of the photographed date is recorded as a 5 bit data.

Note that the data recorded as the information code 30Q may only be the photographed date, for example, and a plurality of data do not have to be recorded.

Figure 9:
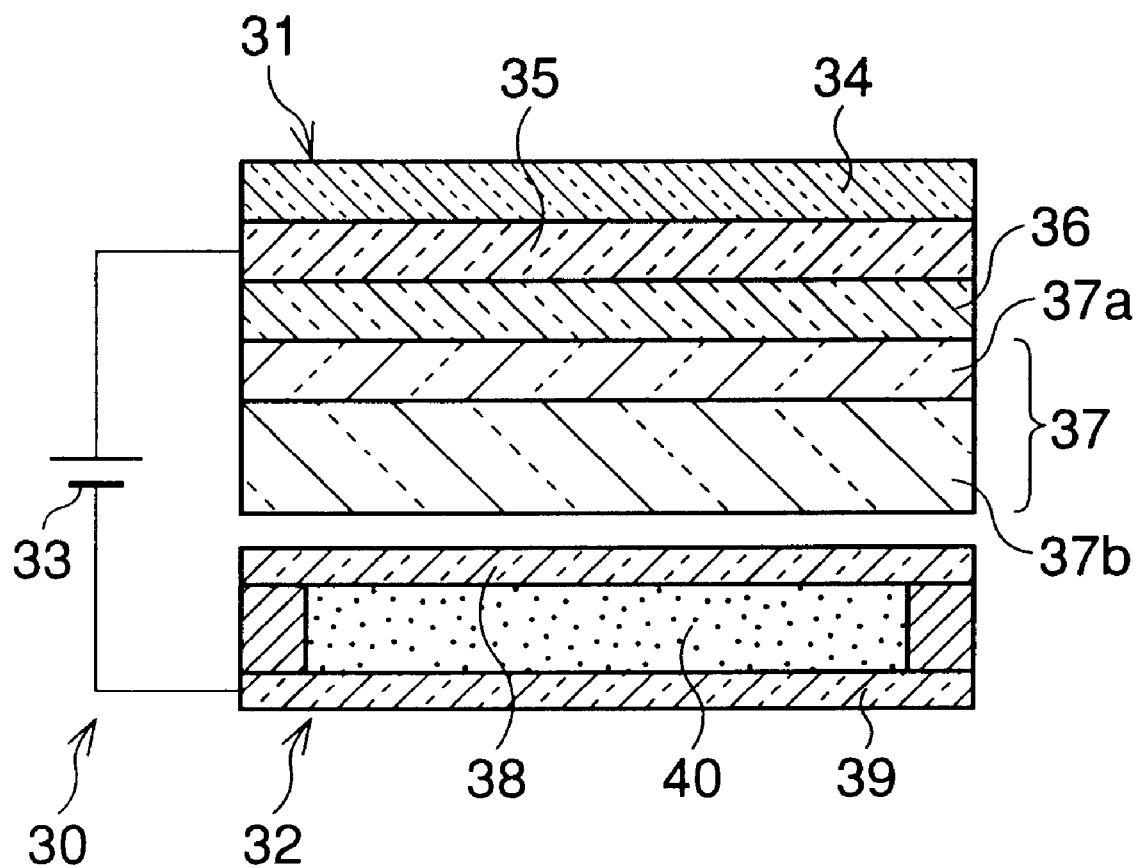
FIG. 9 is a sectional view showing a structure of an electro-developing recording medium.

FIG. 9 shows a structure of the electro-developing recording medium 30, and is the same as that shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge storage medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

An ON-OFF condition of the electric power source 33 is controlled by the recording medium drive circuit 41 (see FIG. 2). When the electric power source 33 is turned on, an electric voltage is applied between the electrode layer 35 and the liquid crystal electrode layer 39, i.e., between the electrostatic information recording medium 31 and the electric charge storage medium 32. When the electrostatic information recording medium 31 is exposed to light while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge storage medium 32 is a liquid crystal display having a memory-type liquid crystal such as a smectic liquid crystal, and thus, the developed visible image is kept therein even if the electric field is removed. In the liquid crystal, the developed visible image can be deleted by heating the liquid crystal, using a heating device (not shown) to a predetermined temperature. Therefore, the same electric charge storage medium 32 can be used repeatedly.

Figure 10:
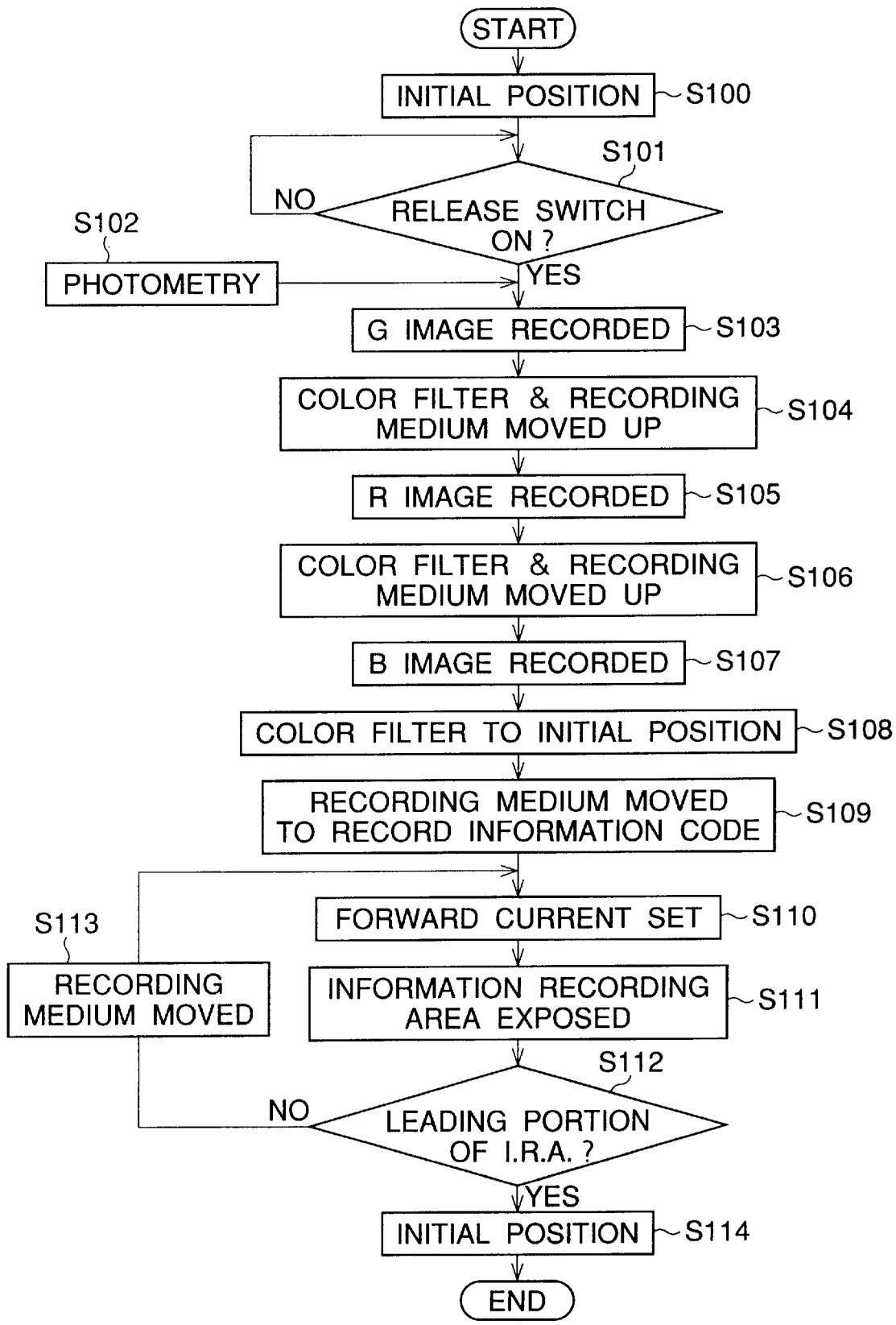
FIG. 10 is a flow chart of an operation by which an image, the positioning marks, and the information code are recorded on the electro-developing recording medium.

FIG. 10 shows a flow chart of an operation by which an image, the positioning marks 301, 302, and 303, and the information code 30Q are recorded on the electro-developing recording medium 30.

In Step S100, the electro-developing recording medium 30 and the color filter 70 are moved to the initial positions thereof which are shown in FIGS. 2 and 4. Namely, the G filter element 70G of the color filter 70 faces the shutter 22, and the first recording area 30G of the electro-developing recording medium 30 faces the filter element 70G. Thus, the G filter element 70G and the first recording area 30G are positioned on the optical axis of the photographing optical system 12.

For this positioning operation, a first plate is provided on the color filter 70, and a second plate is provided on a recording medium holder supporting the electro-developing recording medium 30. First and second photoemitters are located at a portion which corresponds to the initial position. Namely, the initial position of the color filter 70 is detected by the first photo-emitter when the first plate is positioned therein to cut a light beam outputted by the first photo-emitter. The initial position of the electro-developing recording medium 30 is detected by the second photo-emitter when the second plate is positioned therein to cut a light beam outputted by the second photo-emitter. In the system control circuit 20, the position of the electro-developing recording medium 30 is sensed based on the rotated amount and direction of the stepping motor included in the moving mechanism 80, which are measured from the initial position.

In Step S101, when it is sensed that the release button 14 has been depressed, the process goes to Step S102, in which an output signal of the photometry sensor 28, i.e., a photometry value, is sensed, and a photometry calculation is performed based on the photometry value.

When a predetermined time has passed since the release button 14 is depressed, Step S103 is executed so that a photographing operation is performed. Namely, an electric voltage is applied to the first recording area 30G of the electro-developing recording medium 30, and the opening degree of the aperture 12a is set to a predetermined opening degree. While keeping the quick return mirror 21 in the up position, the LED 73c of the positioning mark light source 73 is light for a predetermined period, and thus, a positioning mark 301 is formed on a portion beside the first recording area 30G, and the shutter 22 is opened for the exposure time obtained by the photometry calculation, so that a G image is recorded in the first recording area 30G.

When the record of the G image is completed and the shutter 22 is closed, the aperture 12a is fully opened and the quick return mirror 21 is changed from the up position to the down position. Further, the voltage of the first recording area 30G is set to 0 volt. Then, in Step S104, the color filter 70 and the electro-developing recording medium 30 are both driven by, for example, a DC motor to move up by one frame's worth, so that the R filter element 70R and the second recording medium 30R are positioned on the optical axis of the photographing optical system 12. In this state, Step S105 is executed, a positioning mark 302 is formed on a portion beside the second recording area 30R and an R image is recorded in the second recording area 30R, while the opening degree of the aperture 12a is set to a predetermined amount and the quick return mirror 21 is set to the up position.

When the record of the R image is completed and the shutter 22 is closed, the aperture 12a is fully opened, the quick return mirror 21 is changed from the up position to the down position, and the voltage of the second recording area 30R is set to 0 volt. Then, in Step S106, the color filter 70 and the electro-developing recording medium 30 are driven by the DC motor to move up by one frame's worth of image, respectively, so that the B filter element 70B and the third recording medium 30B are positioned on the optical axis of the photographing optical system 12. In this state, Step S107 is executed, a positioning mark 303 is formed on a portion beside the third recording area 30B and a B image is recorded in the second recording area 30B, while the opening degree of the aperture 12a is set to a predetermined amount and the quick return mirror 21 is set to the up position.

When the record of the B image is completed and the shutter 22 is closed, the aperture 12a is fully opened, the quick return mirror 21 is changed from the up position to the down position, and the voltage of the third recording area 30B is set to 0 volt. Then, in Step S108, the color filter 70 is returned to the initial position, and the information codes 30Q are recorded in Step 109 and the remaining steps. Namely, in this embodiment, the information codes 30Q are recorded after all of the recording areas 30G, 30R, and 30B are recorded.

In Step S109, the electro-developing recording medium 30 is moved to a position where the lowest part of the information codes 30Q, which is to be recorded, faces the slit 73d of the positioning mark light source 73. For example, when the information codes 30Q are intended to be recorded in a portion close to the first, second, and third recording areas 30G, 30R, and 30B, the electro-developing recording medium 30 is set in such a manner that the lowest portion of the part, which is to be recorded as the information code 30Q corresponding to the third recording area 30B, faces the slit 73d.

In Step S110, the amount of the forward current supplied to the light emitting diodes included in the positioning mark light source drive circuit 74 is determined so that the amount of light for forming a symbol, which is to be recorded in Step S111 as a part of the information code 30Q, is outputted by the LED 73c. In Step 111, the LED 73c is lit by the forward current set in Step S110, and thus, the information recording area 30L is exposed for a predetermined period. Namely, predetermined portions of the information recording area 30L are exposed so that the transmittances of the portions become the values corresponding to "1" or "0". In Step S112, it is determined whether or not the slit 73d faces the leading portion of the information recording area 30L, i.e., a portion corresponding to the upper most portion of the information codes 30Q which are to be recorded.

When it is determined in Step S112 that the leading portion of the information recording area 30L does not face the slit 73d, Step S113 is executed so that the electro-developing recording medium 30 is moved by, for example, a stepping motor by a predetermined amount. Namely, the electro-developing recording medium 30 is positioned in such a manner that the slit 73d faces a portion where a symbol included in the information code 30Q is to be formed in the next process. Then, Step S110 is again executed, and thus, the operations described above are carried out.

Conversely, when it is determined in Step S112 that the leading portion of the information recording area 30L faces the slit 73d, since the recording operation of the information recording areas 30Q has been completed, the process goes from Step S112 to Step S114. Namely, the electro-developing recording medium 30 is moved to the initial position where the electro-developing recording medium 30 was set in Step S101, and then, this recording operation ends.

Figure 11:
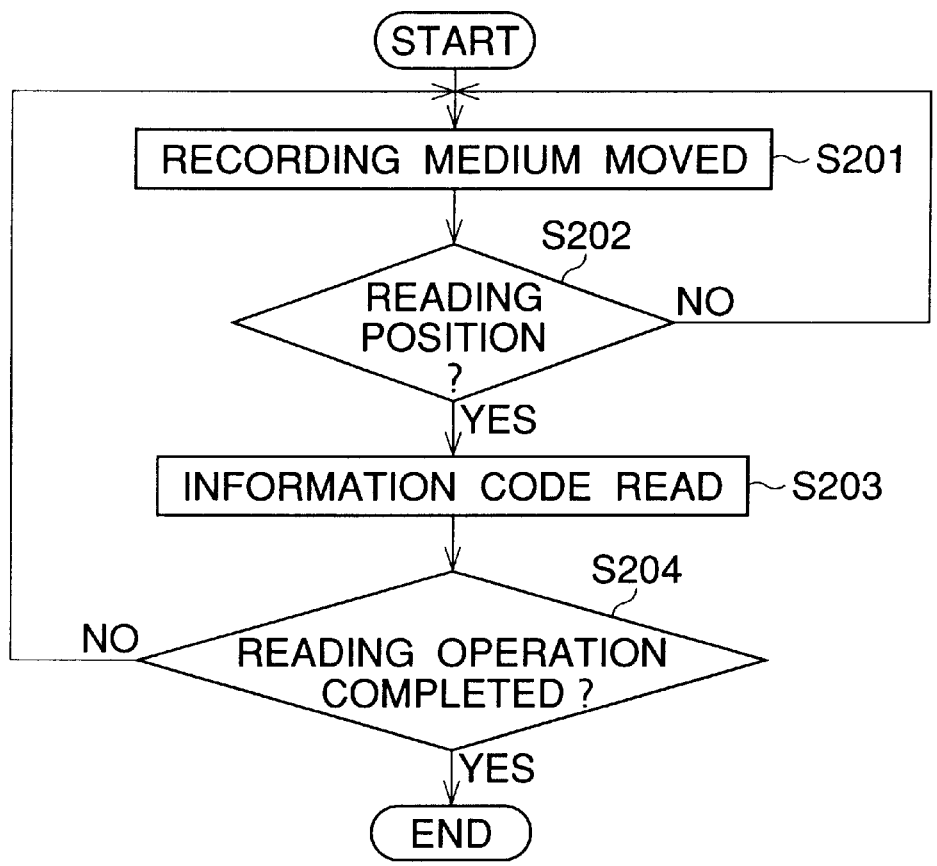
FIG. 11 is a flow chart of a reading operation, in which an information code recorded on the electro-developing recording medium is read.

FIG. 11 shows a flow chart of the reading operation, in which the information codes 30Q recorded on the electro-developing recording medium 30 are read. This reading operation is carried out while reading the images recorded in the image recording areas 30G, 30R, and 30B. Namely, FIG. 11 shows a data process in which data regarding the information recording areas 30Q are extracted from data read by the line sensor 44.

In Step S201, the electro-developing recording medium 30 is moved by one horizontal scanning line which is sensed by the line sensor 44 at one sensing operation. In Step S202, it is determined whether or not the electro-developing recording medium 30 has been set to a code reading position at which the line sensor 44 should read the information code 30Q. When the electro-developing recording medium 30 has not been set to the code reading position, Step S201 is again performed. Then, when the electro-developing recording medium 30 has reached the code reading position, Step S203 is executed so that one bit of the information code 30Q is read.

Then, the process goes from Step S203 to Step S204, in which the reading operation of the information code 30Q has been completed. When the information code 30Q is an 8 bit data, it is determined in Step S204 whether or not all of the 8 bit data have been read. When the reading operation has not been completed, Step S201 is again performed, and when the reading operation has been completed, the 8 bit data are decoded and indicated by the display device 68 (see FIG. 2). Thus, the reading operation of the information code 30Q is performed, while the electro-developing recording medium 30 is moved by one horizontal scanning line at each time from the positioning mark 301, 302, or 303.

As described above, in the embodiment, the information recording areas 30L are provided beside the image recording areas 30G, 30R, and 30B, and information other than an image such as a photographed data can be recorded in the information recording areas 30L. Therefore, when the images recorded in the image recording areas 30G, 30R, and 30B are reproduced, the information related to the images can be indicated by the display device 68.

Further, in the embodiment, the information codes 30Q correspond to the color temperature. Therefore, when the images are read from the image recording areas 30G, 30R, and 30B by the line sensor 44, the amount of light emitted by the LED 42b of the main light source 42 is adjusted based on the transmittances of the information codes 30Q, so that the white balance adjustment can be performed.

In the recording operation of the information code 30Q in the embodiment, the electro-developing recording medium 30 may be moved by the stepping motor at a constant speed. Conversely, if the electro-developing recording medium 30 is moved by a DC motor, for example, since the moving speed cannot be controlled so as to have a constant value, the information code 30Q needs to be constructed in such a manner that a portion, in which bit data "1" or "0" of the information code 30Q is recorded, can be recognized in the reading operation. A second embodiment described below is constructed in such a manner that the information codes 30Q can be recorded in and read from the electro-developing recording medium 30, even when the moving speed of the electro-developing recording medium 30 is not constant.

Figure 12:
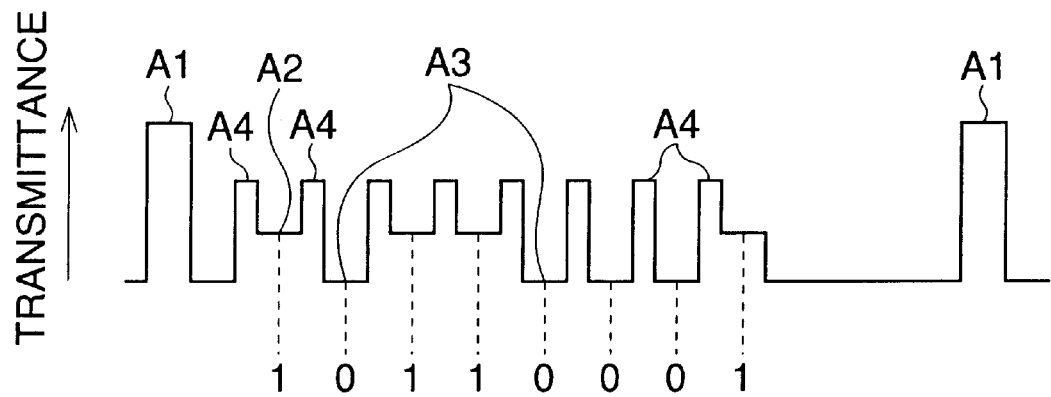
FIG. 12 is a view showing an example of transmittances of linear images which are recorded in the electro-developing recording medium, as a positioning mark and an information code, in a second embodiment.

FIG. 12 show s an example of transmittances of linear images which are recorded in the electro-developing recording medium 30, as the positioning marks 301, 302, and 303, and the information code 30Q, in the second embodiment. Note that the constructions shown in FIGS. 1 and 2 are the same in the second embodiment.

Each of the positioning marks 301, 302, and 303 has the highest transmittance as shown by reference A1. In the leading portion and the trailing portion of each of the digital data a and A3 such as "1" and "0" of the information code 30Q, an index A4 having a transmittance which is lower than the positioning marks 301, 302, an d 303 and is higher than the digital data A2 which is "1".

Figures 13, 14:
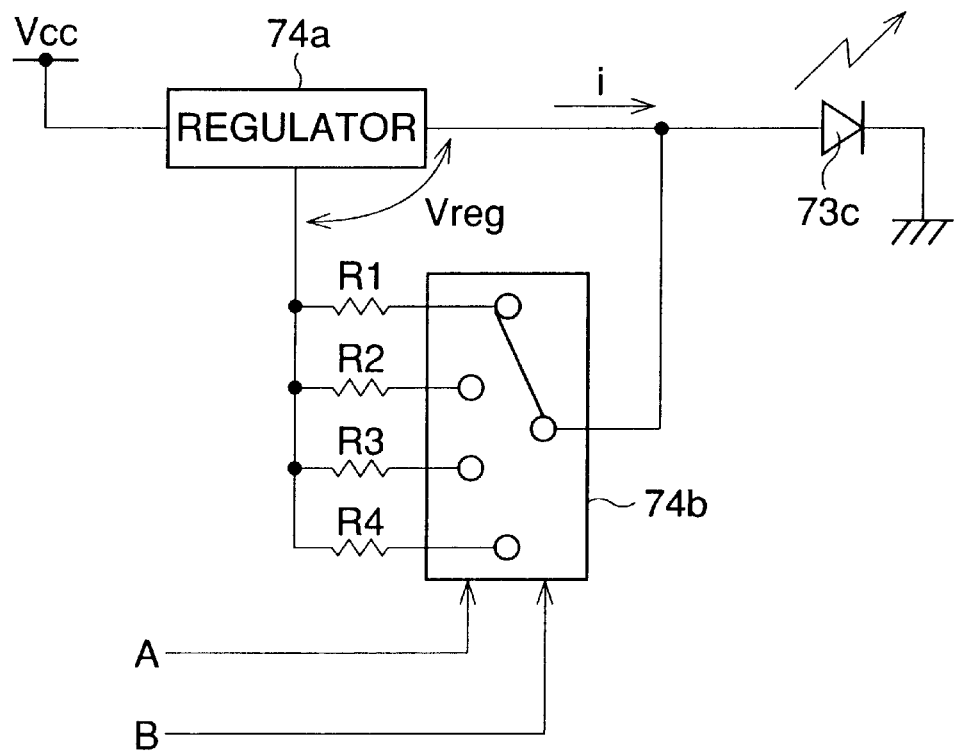
FIG. 13 is a block diagram showing a construction of the positioning mark light source drive circuit of the second embodiment.
FIG. 14 is a table showing signals inputted into the positioning mark light source drive circuit from the system control circuit.

FIG. 13 shows a construction of the positioning mark light source drive circuit 74 of the second embodiment. A power source voltage $V_{cc}$ is c hanged to a predetermined voltage $V_{reg}$ by a regulator 74a, and the predetermined voltage $V_{reg}$ is applied to a switch circuit 74b. The switch circuit 74b is constructed in such a manner that one of resistors R1, R2, R3, or R4 is selectively connected to an LED 73c. The resistors R1, R2, R3, and R4 are in descending order of resistance. Namely, when the resistor R1 is connected to the LED 73c, the value of the forward current (i=$V_{reg}$/R) supplied to the LED 73c becomes smallest, so that "0" data (see reference A3 of FIG. 12) is recorded in the information recording area 30L. When the resistor R4 is connected to the LED 73c, the value of the forward current supplied to the LED 73c becomes largest, so that the positioning marks 301, 302, or 303 (see reference A1 of FIG. 12) are recorded in the image recording areas 30G, 30R, or 30B, respectively.

The switching control of the switch circuit 74b is carried out based on signals A and B inputted from the system control circuit 20. The signals A and B are digital signals of "1" or "0". As shown in FIG. 14, the resistor R1 is connected to the LED 73c when both of the signals A and B are "0", the resistor R2 is connected to the LED 73c when the signal A is "0" and the signal B is "1". The resistor R3 is connected to the LED 73c when the signal A is "1" and the signal B is "0", and the resistor R4 is connected to the LED 73c when both of the signals A and B are "1".

Figure 15:
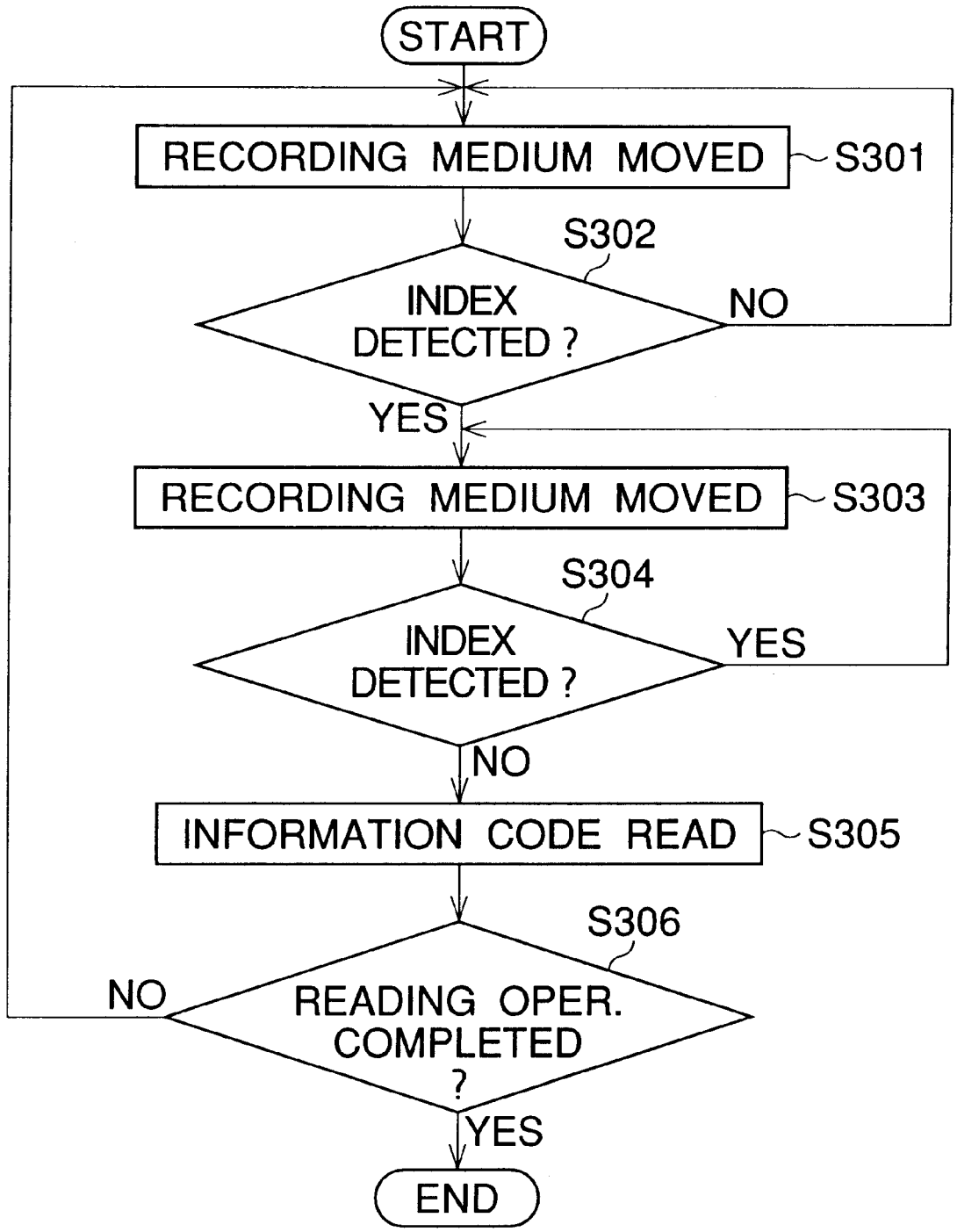
FIG. 15 is a flow chart showing a reading operation in which the information codes recorded in the electro-developing recording medium are read, in the second embodiment.

FIG. 15 shows a flow chart of a reading operation in the second embodiment in which the information codes 30Q recorded in the electro-developing recording medium 30 are read. This reading operation is performed while the images recorded in the image recording areas 30G, 30R, and 30B are read, for example. Namely, FIG. 15 shows a data process in which data regarding the information recording areas 30Q are extracted from data read by the line sensor 44.

In Step S301, the electro-developing recording medium 30 is moved by one horizontal scanning line. Step S301 is repeatedly performed until the index A4 is detected in Step S302. When the index A4 is detected in Step S302, Step S303 is executed so that the electro-developing recording medium 30 is moved by one horizontal scanning line. Step S303 is repeatedly performed so long as the index A4 is detected in Step S304. When the index A4 is not detected in Step 5304, Step S305 is executed so that the information code 30Q is read. In Step S306, it is determined whether or not the reading operation of the information code 30Q has been completed based on the number of bits of the information code 30Q. When the reading operation has not been completed, the process returns to Step S301, and when the reading operation has been completed, the reading operation ends.

As described above, the second embodiment is the same as the first embodiment except that the index A4 is included in the information code 30Q, and therefore, the same effect as the first embodiment can be obtained by the second embodiment.

Figure 16A:
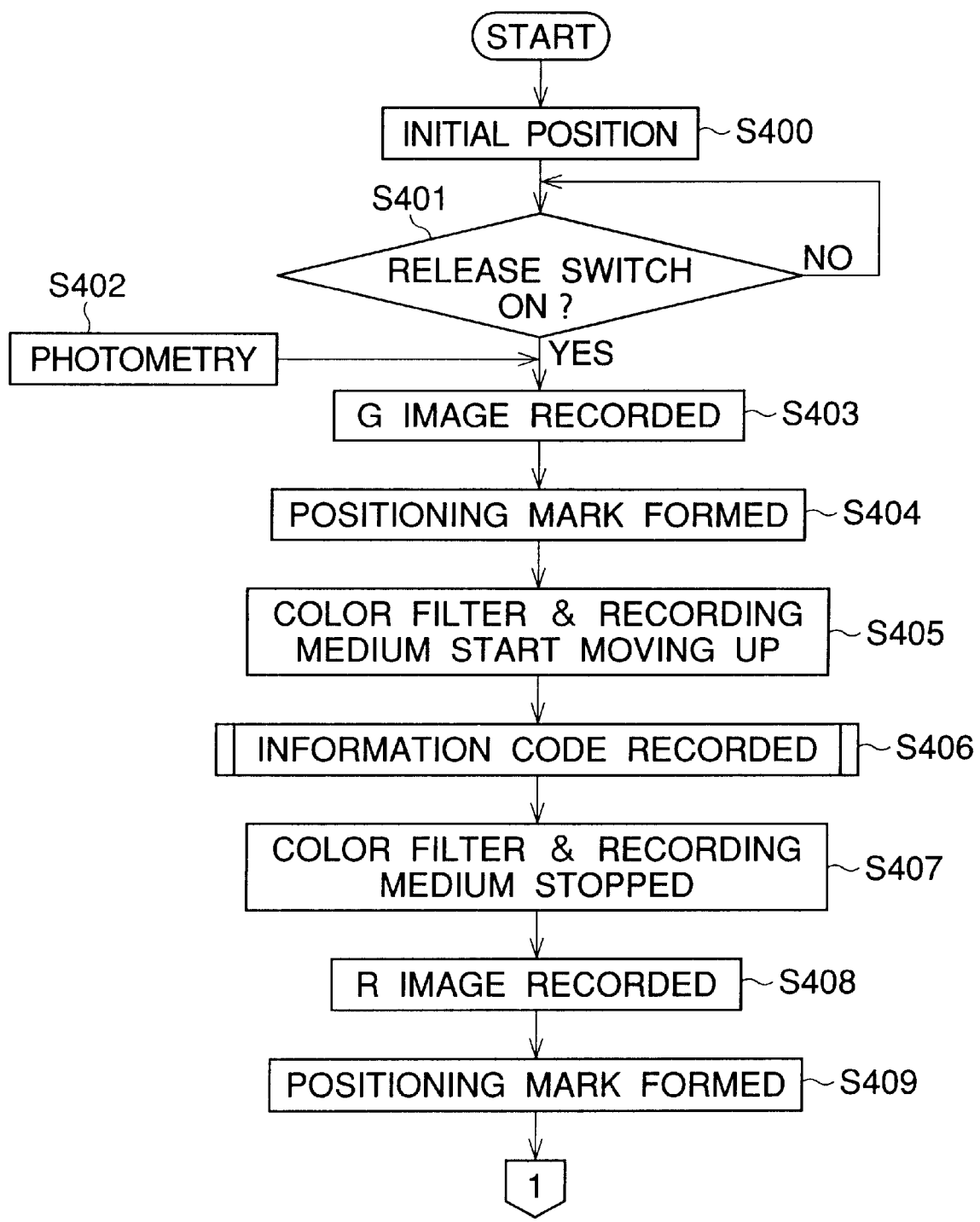
FIGS. 16A and 16B are flow charts showing a reading operation which an image, positioning marks, and information codes are recorded on the electro-developing recording medium, in a third embodiment.
Figure 16B:
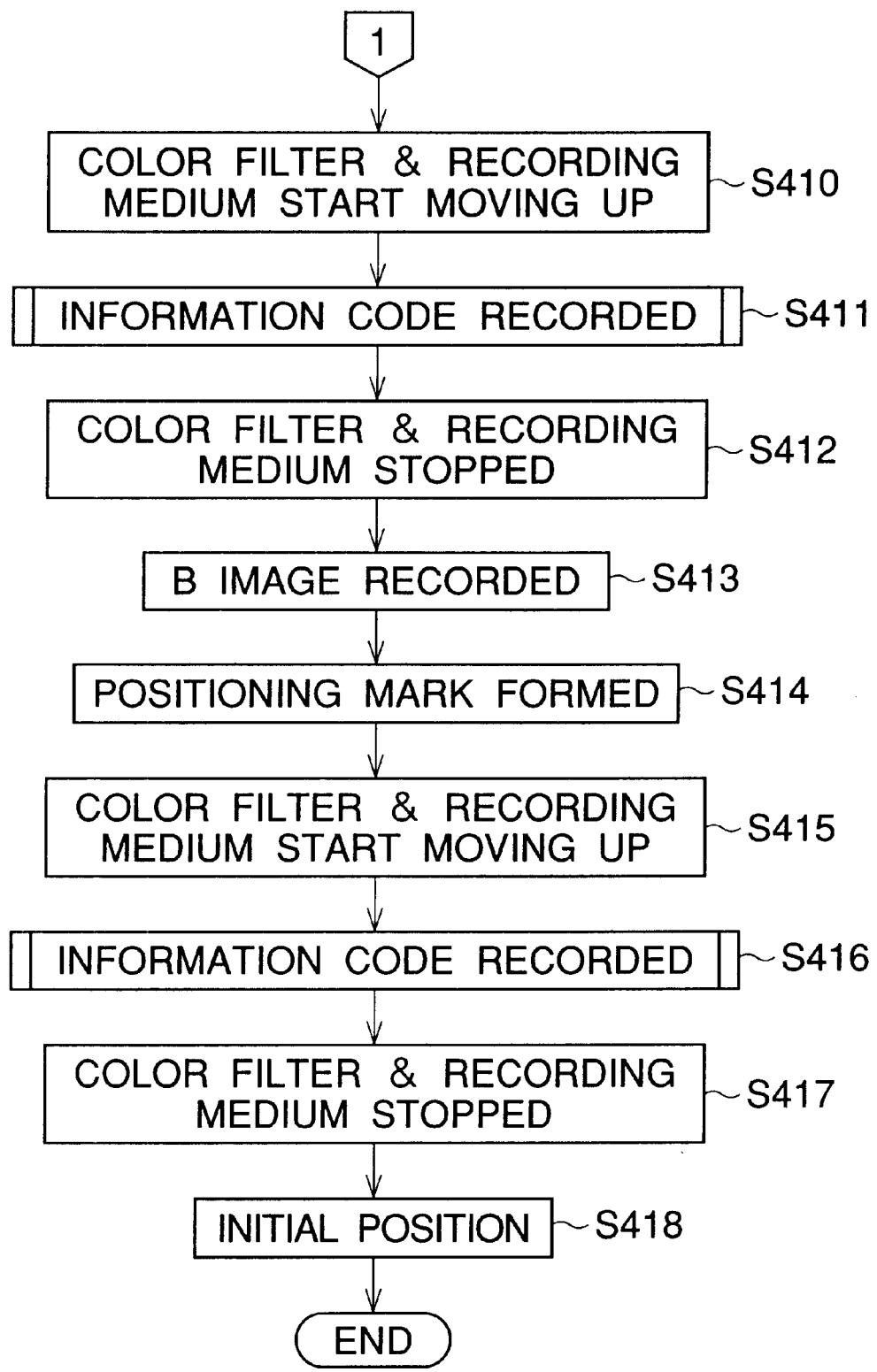

FIGS. 16A and 16B show a flow chart of an operation by which an image, the positioning marks 301, 302, and 303, and the information codes 30Q are recorded on the electro-developing recording medium 30, in a third embodiment. Note that the constructions shown in FIGS. 1 and 2 are the same in the third embodiment.

In Step S400, similar to Step S100 of FIG. 10, the electro-developing recording medium 30 and the color filter 70 are moved to the initial positions thereof, respectively. When it is sensed in Step S401 that the release button 14 has been depressed, Step S402 is executed in which, based on an output signal of the photometry sensor 28, a photometry calculation is performed.

When a predetermined time has passed since the release button 14 is depressed, Step S403 is executed so that a photographing operation is performed. Namely, an electric voltage is applied to the first recording area 30G and the opening degree of the aperture 12a is set to a predetermined opening degree. With keeping the quick return mirror 21 in the up position, a G image is recorded in the first recording area 30G. Then, in Step S404, the LED 73c of the positioning mark light source 73 is light for a predetermined period, and thus, the positioning mark 301 is formed on a portion beside the first recording area 30G.

When the record of the G image is completed and the shutter 22 is closed, the aperture 12a is fully opened and the quick return mirror 21 is changed from the up position to the down position. Further, the voltage of the first recording area 30G is set to 0 volt. Then, in Step S405, the color filter 70 and the electro-developing recording medium 30 are driven by, for example, a DC motor to start moving up, respectively. In Step S406, the amount of forward current supplied to the light emitting diodes of the positioning mark light source drive circuit 74 is changed at a predetermined cycle, so that the amount of light emitted by the LED 73c of the positioning mark light source 73 is changed at the cycle. Thus, during the movement of the electro-developing recording medium 30, the information code 30Q is recorded in the information recording area 30L beside the first recording area 30G.

When the color filter 70 and the electro-developing recording medium 30 have been moved up by one frame's worth of image so that the R filter element 70R and the second recording medium 30R are positioned on the optical axis of the photographing optical system 12, the color filter 70 and the electro-developing recording medium 30 are stopped in Step S407. In this state, Step S408 is executed, an R image is recorded in the second recording area 30R, while the opening degree of the aperture 12a is set to a predetermined amount and the quick return mirror 21 is set to the up position. Then, in Step S409, the LED 73c of the positioning mark light source 73 is light for a predetermined period, so that the positioning mark 302 is formed on a portion beside the second recording area 30R.

Similar to Steps S405 through S409, in Steps S410 through S414, the information code 30Q is recorded in the information recording area 30L beside the second recording area 30R while the color filter 70 and the electro-developing recording medium 30 are moved up. And, while the B filter element 70B and the third recording area 30B on are kept on the optical axis of the photographing optical system 12, the positioning mark 303 is formed on a portion beside the third recording area 30B and a B image is recorded in the third recording area 30B.

In Step S415, the color filter 70 and the electro-developing recording medium 30 are again started to move up, and during the moving up of the color filter 70 and the electro-developing recording medium 30, the information code 30Q is recorded in the information recording area 30L beside the third recording area 30B, in Step S416. When the color filter 70 and the electro-developing recording medium 30 have been moved up by one frame's worth of image, the color filter 70 and the electro-developing recording medium 30 are stopped in Step S417. Then, in Step S418, the color filter 70 and the electro-developing recording medium 30 are returned to the initial positions thereof, respectively, and this recording operation ends.

Figure 17:
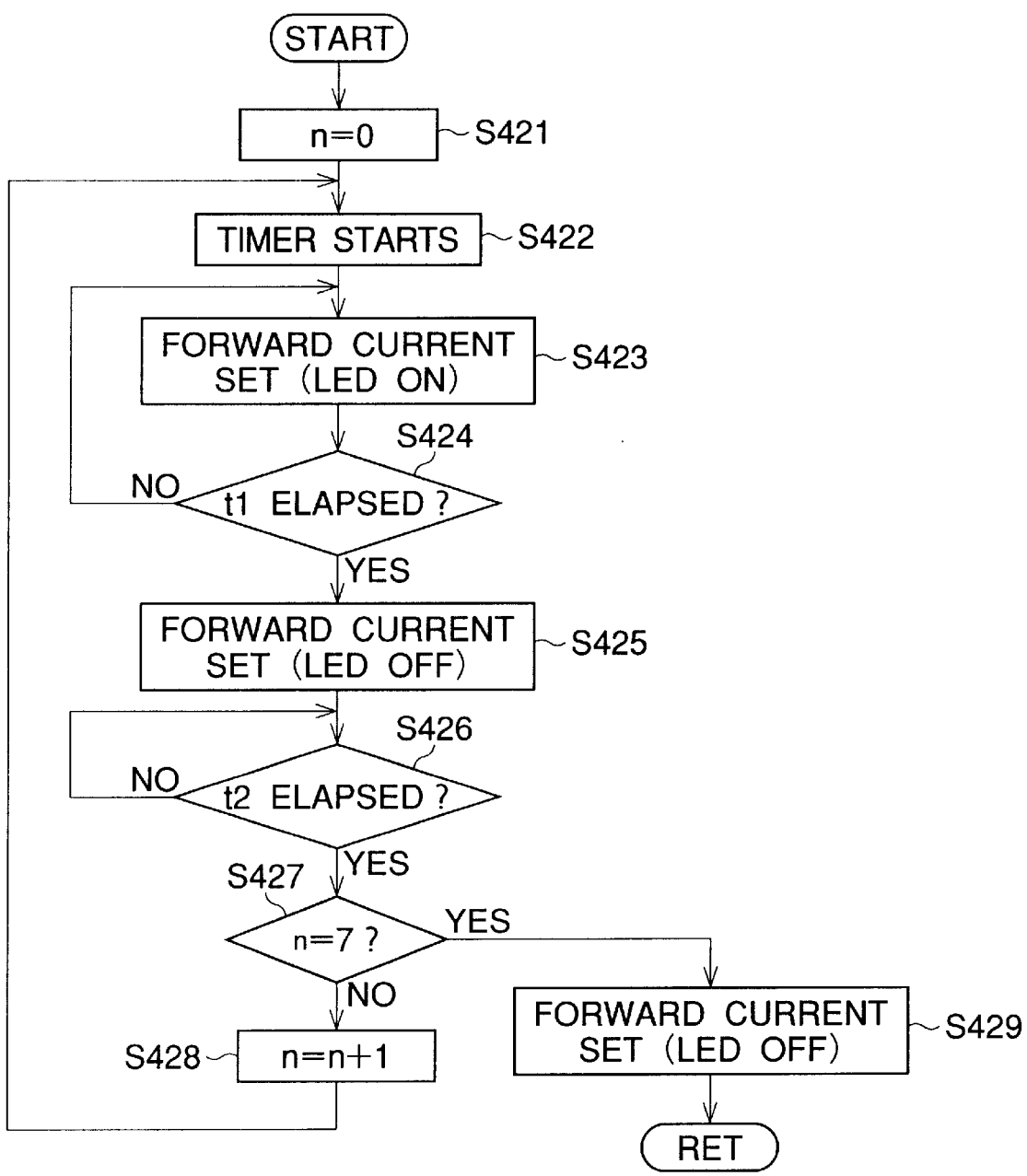
FIG. 17 is a flow chart showing a control operation of the positioning mark light source.

FIG. 17 shows a control operation of the positioning mark light source 73, which is executed in Steps S406, S411, and S416, so that an 8 bit information code 30Q is recorded.

In Step S421, a counter "n" is reset to 0. In Step S422, a timer is reset to 0, and starts counting the time. In Step S423, the forward current supplied to the LED 73c of the positioning light source 73 is set to a predetermined value. It is determined in Step S424 whether or not time t1 has elapsed since the timer starts counting in Step S422. Namely, Step S423 is repeated until time t1 has elapsed, so that a mark corresponding to the forward current is optically recorded in the information recording area 30L, and the mark is one bit included in the information code 30Q.

When it is determined in Step S424 that the predetermined time has elapsed, Step S425 is executed, in which the value of the forward current is set so that the LED 73c is turned OFF. When it is confirmed in Step S426 that time t2 (which is longer than t1) has elapsed since the timer starts counting in Step S422, it is determined in Step S427 whether or not the counter "In" has become 7. When the counter "n" has not become 7, the counter "n" is incremented by 1 in Step S428, and the process returns to Step S422, so that the operations described above are performed again. Thus, the loop of Steps S422 through S428 is performed eight times, so that the information code 30Q of 8 bit is recorded. Then, when it is determined in Step S427 that the counter "n" has become 7, the LED 73c is turned OFF, and the control operation ends.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-104534 (filed on Apr. 2, 1996) which is expressly incorporated herein, by reference, in its entirety.

I claim:

1. A device for recording information, comprising:

an electro-developing recording medium by which an image formed thereon is electronically developed, said electro-developing recording medium having an image recording area, in which an object image is recorded, said image recording area comprising a primary image recording area for each of a plurality of primary color images and an information recording area, in which information other than said object image is recorded;

a positioning mark recording processor that records positioning marks for each of said primary image recording areas in said information recording area, and records information related to an object image in said information recording area, said positioning marks being adapted for adjusting a relative position of each of said primary color images said related information being recorded by repeatedly turning ON and OFF a light beam emitted by a light source; and a moving mechanism that moves one of said electro-developing recording medium and a light source in a predetermined direction, said positioning mark recording processor recording said related information while said one of said electro-developing recording medium and said light source is moved by said moving mechanism.

2. A device according to claim 1, said positioning mark recording processor recording positioning marks beside said plurality of primary image recording areas to indicate the relative position of each of said primary color images.

3. A device according to claim 1, said related information being recorded in a form of a bar code which is arranged in said predetermined direction.

4. A device according to claim 3, wherein said bar code is formed by turning ON said light source.

5. A device according to claim 3, wherein said electro-developing recording medium has a plurality of said primary image recording areas, and said moving mechanism moves said electro-developing recording medium in a direction along which said plurality of image recording areas are arranged.

6. A device according to claim 5, wherein said image is color-separated into a red image, a green image, and a blue image, each of said images being recorded in one of said plurality of primary image recording areas.

7. A device according to claim 5, wherein said positioning mark recording processor records said related information after all of said plurality of primary color images for an object image have been recorded.

8. A device according to claim 5, wherein said light source forms a positioning mark at a portion close to each of said primary image recording areas so that said red, green, and blue images can be superimposed.

9. A device according to claim 1, wherein said image is developed by exposing said electro-developing recording medium while applying an electric voltage thereto, and said image recording area and said information recording area are electrically separate from each other.

10. A device according to claim 9, said positioning mark recording processor recording said other information after all of said primary image recording areas have been recorded.

11. The device for recording information according to claim 1, said positioning mark recording processor recording each of said positioning marks in association with recording of a primary color image in each of said primary image recording areas.

12. The device according to claim 1, said positioning mark recording processor recording each of said positioning marks in said information recording area after said moving mechanism has positioned said one of said electro-developing recording medium and said light source at a position associated with a respective primary image recording area.

13. A device for recording information, said device comprising:

an electro-developing recording medium by which an image formed thereon is electronically developed, said electro-developing recording medium having an image recording area in which an object image is recorded, said image recording area comprising a primary image recording area for each of a plurality of primary color images, said electro-developing recording medium further having an information recording area in which information other than said object image is recorded, a recording processor that records information in said information recording area, said information recording processor recording a positioning mark associated with each of said primary image recording areas in said information recording area, said positioning mark being adapted for adjusting a relative position of each of said primary color images, said recording processor further recording data related to an object image in said information recording area; and a moving mechanism that moves one of said electro-developing recording medium and a light source in a predetermined direction, said recording processor recording each of said positioning marks concurrently with recording of an object image in one of said primary image recording area while said one of said electro-developing recording medium and said light source that is moved by said moving mechanism is stationary, said recording processor recording said data related to an object image for a plurality of primary image recording areas making up an object image during movement of said one of said electro-developing recording medium and said light source by said moving mechanism.

* * * * *